United States Patent
Xu

(10) Patent No.: US 11,782,976 B2
(45) Date of Patent: Oct. 10, 2023

(54) METHOD FOR QUERYING INFORMATION AND DISPLAY DEVICE

(71) Applicant: BOE Technology Group Co., Ltd., Beijing (CN)

(72) Inventor: Chu Xu, Beijing (CN)

(73) Assignee: BOE TECHNOLOGY GROUP CO., LTD., Biejing (CN)

( * ) Notice: Subject to any disclaimer, the term of this patent is extended or adjusted under 35 U.S.C. 154(b) by 406 days.

(21) Appl. No.: 17/046,321

(22) PCT Filed: Sep. 27, 2019

(86) PCT No.: PCT/CN2019/108720
§ 371 (c)(1),
(2) Date: Oct. 9, 2020

(87) PCT Pub. No.: WO2021/056467
PCT Pub. Date: Apr. 1, 2021

(65) Prior Publication Data
US 2023/0121168 A1 Apr. 20, 2023

(51) Int. Cl.
*G06F 16/00* (2019.01)
*G06F 16/635* (2019.01)
*G06F 16/638* (2019.01)

(52) U.S. Cl.
CPC .......... *G06F 16/635* (2019.01); *G06F 16/638* (2019.01)

(58) Field of Classification Search
CPC ............................ G06F 16/635; G06F 16/638
See application file for complete search history.

(56) References Cited

U.S. PATENT DOCUMENTS

| 7,310,600 B1 * | 12/2007 | Garner | G10L 15/12 704/239 |
| 10,489,393 B1 * | 11/2019 | Mittal | G06F 16/2455 |
| 11,016,964 B1 * | 5/2021 | Hinegardner | G06F 16/2428 |

(Continued)

FOREIGN PATENT DOCUMENTS

| CN | 108170859 A | 6/2018 |
| CN | 108804532 A | 11/2018 |

(Continued)

OTHER PUBLICATIONS

International search report of PCT application No. PCT/CN2019/108720 dated Jul. 3, 2020.

(Continued)

*Primary Examiner* — Jared M Bibbee
(74) *Attorney, Agent, or Firm* — Lippes Mathias LLP

(57) ABSTRACT

A method for querying information includes: acquiring an information query instruction; obtaining a query intention by performing intention identification on the works information query instruction; determining a type of the query intention in a plurality of intention types; obtaining an entity detection result by detecting whether the query intention contains an author entity and a painting entity; acquiring a query result based on the query intention and reference information, wherein the reference information includes the type of the query intention and the entity detection result, and the query result includes at least one information of an image, an audio and a text; and displaying the query result.

13 Claims, 5 Drawing Sheets

(56) References Cited

U.S. PATENT DOCUMENTS

| | | | |
|---|---|---|---|
| 2013/0282702 A1 | 10/2013 | Zhu et al. | |
| 2016/0055160 A1* | 2/2016 | Himel | G06F 16/248 |
| | | | 707/728 |
| 2016/0085800 A1* | 3/2016 | Pujari | G06F 16/2423 |
| | | | 707/765 |
| 2017/0075988 A1* | 3/2017 | Kadiri | G06F 16/3329 |
| 2018/0144385 A1 | 5/2018 | Subramanya et al. | |
| 2018/0276553 A1* | 9/2018 | Redkar | G06N 5/022 |
| 2018/0322155 A1* | 11/2018 | Alonso | G06F 16/26 |
| 2019/0197165 A1* | 6/2019 | Lyubimov | G06F 16/24575 |
| 2019/0197487 A1* | 6/2019 | Jersin | H04L 51/214 |
| 2019/0279628 A1* | 9/2019 | Luo | H04N 21/4394 |
| 2021/0073215 A1* | 3/2021 | Srinivasaraghavan | G06N 7/01 |

FOREIGN PATENT DOCUMENTS

| | | |
|---|---|---|
| CN | 109547840 A | 3/2019 |
| CN | 109783736 A | 5/2019 |
| CN | 110008413 A | 7/2019 |

OTHER PUBLICATIONS

China National Intellectual Property Administration, First office action of Chinese application No. 201980001847.2 dated Apr. 14, 2023, which is foreign counterpart application of this US application.

* cited by examiner

METHOD FOR QUERYING INFORMATION AND DISPLAY DEVICE

CROSS-REFERENCE TO RELATED APPLICATION

The present application is a 371 of PCT Application No. PCT/CN2019/108720, filed on Sep. 27, 2019, the content of which is incorporated herein by reference.

TECHNICAL FIELD

The present disclosure relates to the field of display technologies, and in particular relates to a method for querying information and a display device.

BACKGROUND

Various display devices, such as computers, televisions, e-books and electronic painting screens, have emerged with the development of display technologies.

Each of the display devices is capable of displaying images. For example, the electronic painting screen is capable of displaying various works. Moreover, the electronic painting screen is popular with people because of its vivid display effect and allowance for changing works to be displayed.

SUMMARY

Embodiments of the present disclosure provide a method for querying information and a display device, of which the technical solutions are described as below.

In one aspect, a method for querying information is provided. The method is applicable to a display device, and includes:

acquiring a works information query instruction;

obtaining a query intention by performing intention identification on the works information query instruction;

determining a type of the query intention in a plurality of intention types;

detecting whether the works information query instruction contains at least one target entity;

acquiring a query result according to the query intention and reference information, wherein the reference information includes the type of the query intention and a detection result indicating whether the works information query instruction contains at least one target entity, and the query result includes at least one information of an image, an audio, and a text; and displaying the query result.

Optionally, the at least one target entity contains a first target entity containing author information of works and/or a second target entity containing title information of the works.

Optionally, the at least one target entity contains the second target entity, and the method further includes:

detecting, when the works information query instruction contains the second target entity, whether current works displayed by the display device is the same as target works indicated by the second target entity; and the reference information further includes a detection result indicating whether the current works is the same as the target works.

Optionally, the plurality of intention types include a first type, intentions involved in the first type include intentions relevant to introduction of works, and before acquiring the query result according to the query intention and the reference information, the method further includes:

determining, when the type of the query intention is the first type, works to be introduced according to the detection result indicating whether the works information query instruction contains the at least one target entity; wherein the works to be introduced is the target works indicated by the second target entity if the works information query instruction at least contains the second target entity, and the works to be introduced is any works of an author indicated by the first target entity if the works information query instruction contains the first target entity but does not contain the second target entity; and detecting whether an audio library contains an introduction audio of the works to be introduced, wherein the reference information further includes a detection result indicating whether the audio library contains the introduction audio of the works to be introduced.

Optionally, acquiring the query result according to the query intention and the reference information includes:

acquiring, when the type of the query intention is the first type, the introduction audio in the audio library if the audio library contains the introduction audio, the works information query instruction at least contains the second target entity, and the current works is the same as the target works, wherein the query result includes the introduction audio;

acquiring, when the type of the query intention is the first type, an image of the target works and the introduction audio in the audio library if the audio library contains the introduction audio, the works information query instruction at least contains the second target entity and the current works is different from the target works, wherein the query result includes the image of the target works and the introduction audio; and acquiring, when the type of the query intention is the first type, the introduction audio in the audio library if the audio library contains the introduction audio and the works information query instruction contains the first target entity but not does not contain the second target entity, wherein the query result includes the introduction audio.

Optionally, acquiring the query result according to the query intention and the reference information includes:

acquiring, when the type of the query intention is the first type, an introduction text of the works to be introduced and an audio of the introduction text if the audio library does not contain the introduction audio, the works information query instruction at least contains the second target entity and the current works is the same as the target works, wherein the query result includes the introduction text of the works to be introduced and the audio of the introduction text;

acquiring, when the type of the query intention is the first type, an image of the works to be introduced, an introduction text of the works to be introduced and an audio of the introduction text if the audio library does not contain the introduction audio, the works information query instruction at least contains the second target entity and the current works is different from the target works, wherein the query result includes the image of the works to be introduced, the introduction text of the works to be introduced and the audio of the introduction text; and acquiring, when the type of the query intention is the first type, an introduction text of the works to be introduced and an audio of the introduction text if the audio library does not contain the introduction audio and the works information query instruction contains the first target entity but does not contain the second target entity, wherein the query result includes the introduction text of the works to be introduced and the audio of the introduction text.

Optionally, the plurality of intention types include a second type, intentions involved in the second type include intentions relevant to any information of an information group, the information group includes author information, and works information other than its introduction, and acquiring the query result according to the query intention and the reference information includes:

acquiring, when the type of the query intention is the second type, a text of the any information and an audio of the text of the any information if the works information query instruction at least contains the second target entity and the current works is the same as the target works, wherein the query result includes the text of the any information and the audio of the text of the any information;

acquiring, when the type of the query intention is the second type, an image of the target works, a text of the any information and an audio of the text of the any information if the works information query instruction at least contains the second target entity and the current works is different from the target works, wherein the query result includes the image of the target works, the text of the any information, and the audio of the text of the any information; and acquiring, when the type of the query intention is the second type, a text of the any information and an audio of the text of the any information if the works information query instruction contains the first target entity but does not contain the second target entity, wherein the query result includes the text of the any information, and the audio of the text of the any information.

Optionally, the plurality of intention types include a third type, intentions involved in the third type include intentions relevant to play of works, and acquiring the query result according to the query intention and the reference information includes:

acquiring, when the type of the query intention is the third type, an audio for prompting that the current works is the target works if the works information query instruction at least contains the second target entity and the current works is the same as the target works, wherein the query result includes the audio for prompting that the current works is the target works; and acquiring, when the type of the query intention is the third type, an image of the target works and an audio for indicating the target works if the works information query instruction at least contains the second target entity and the current works is different from the target works, wherein the query result includes the image of the target works and the audio for indicating the target works.

Optionally, acquiring the query result according to the query intention and the reference information further includes:

determining, when the type of the query intention is the third type, whether an author of the current works is the same as a target author indicated by the first target entity of the query intention if the works information query instruction contains the first target entity but does not contain the second target entity;

acquiring an audio for indicating that the current works is the only works of the target author if the author of the current works is the same as the target author and the current works is the only works of the target author, wherein the query result includes the audio for indicating that the current works is the only works of the target author;

acquiring an image of first works and an audio for indicating the first works if the author of the current works is the same as the target author and the current works is not the only works of the target author, wherein the first works is any works other than the current works of the target author, and the query result includes the image of the first works and the audio for indicating the first works; and acquiring an image of second works and an audio for indicating the second works if the author of the current works is different from the target author, wherein the second works is any works of the target author, and the query result includes the image of the second works and the audio for indicating the second works.

Optionally, acquiring the query result according to the query intention and the reference information further includes:

acquiring, when the type of the query intention is the third type, an image of third works and an audio for indicating the third works if the works information query instruction does not contain the first target entity or the second target entity, wherein the query result includes the image of the third works and the audio for indicating the third works;

wherein the third works is any works of other authors than the author of the current works if the current works is the only works of the author; and the third works is any works of the author of the current works other than the current works if the current works is not the only works of the author.

Optionally, acquiring the works information query instruction contains:

acquiring the works information query instruction in voice form by voice collection.

Optionally, the works includes a painting.

In another aspect, there is provided a display device, including a processor, a display screen, and a speaker; wherein the processor is configured to:

acquire a works information query instruction;

obtain a query intention by performing intention identification on the works information query instruction;

determine a type of the query intention in a plurality of intention types;

detect whether the works information query instruction contains at least one target entity;

acquire a query result according to the query intention and reference information, wherein the reference information includes the type of the query intention and a detection result indicating whether the works information query instruction contains at least one target entity, and the query result includes at least one information of an image, an audio and a text;

control the display screen to display an image in the query result if the query result includes the image;

control the display screen to display a text in the query result if the query result includes the text; and control the speaker to play an audio in the query result if the query result includes the audio.

Optionally, the at least one target entity contains a first target entity containing author information of works and/or a second target entity containing title information of the works.

Optionally, the at least one target entity contains the second target entity. The processor is further configured to detect, when the works information query instruction contains the second target entity, whether current works displayed by the display device is the same as target works indicated by the second target entity; and the reference information further includes a detection result indicating whether the current works is the same as the target works.

Optionally, the plurality of intention types include a first type, intentions involved in the first type of intentions include intentions relevant to introduction of works, The processor is further configured to:

determine, when the type of the query intention is the first type, works to be introduced according to the detection result indicating whether the works information query instruction contains at least one target entity; wherein the works to be introduced is the target works indicated by the second target entity if the works information query instruction at least contains the second target entity; and the works to be introduced is any works of an author indicated by the first target entity when the works information query instruction contains the first target entity but does not contain the second target entity; and detect whether an audio library contains an introduction audio of the works to be introduced, wherein the reference information further includes a detection result indicating whether the audio library contains the introduction audio of the works to be introduced.

Optionally, the processor is configured to: acquire, when the type of the query intention is the first type, the introduction audio in the audio library if the audio library contains the introduction audio, the works information query instruction at least contains the second target entity, and the current works is the same as the target works, wherein the query result includes the introduction audio;

acquire, when the type of the query intention is the first type, an image of the target works and the introduction audio in the audio library if the audio library contains the introduction audio, the works information query instruction at least contains the second target entity, and the current works is different from the target works, wherein the query result includes the image of the target works and the introduction audio; and acquire, when the type of the query intention is the first type, the introduction audio in the audio library if the audio library contains the introduction audio and the works information query instruction contains the first target entity but does not contain the second target entity, wherein the query results includes the introduction audio.

Optionally, the processor is configured to: acquire, when the type of the query intention is the first type, an introduction text of the works to be introduced and an audio of the introduction text if the audio library does not contain the introduction audio, the works information query instruction at least contains the second target entity, and the current works is the same as the target works, wherein the query result includes the introduction text of the works to be introduced and the audio of the introduction text;

acquire, when the type of the query intention is the first type, an image of the works to be introduced, an introduction text of the works to be introduced and an audio of the introduction text if the audio library does not contain the introduction audio, the works information query instruction at least contains the second target entity and the current works is different from the target works, wherein the query result includes the image of the works to be introduced, the introduction text of the works to be introduced and the audio of the introduction text; and acquire, when the type of the query intention is the first type, an introduction text of the works to be introduced and an audio of the introduction text if the audio library does not contain the introduction audio, and the works information query instruction contains the first target entity but does not contain the second target entity, wherein the query result includes the introduction text of the works to be introduced and the audio of the introduction text.

Optionally, the plurality of intention types include a second type, intentions involved in the second type include intentions relevant to any information of an information group, the information group includes author information, and works information other than its introduction, and the processor is configured to: acquire, when the type of the query intention is the second type, a text of the any information and an audio of the text of the any information if the works information query instruction at least contains the second target entity and the current works is the same as the target works, wherein the query result includes the text of the any information and the audio of the text of the any information;

acquire, when the type of the query intention is the second type, an image of the target works, a text of the any information and an audio of the text of the any information if the works information query instruction at least contains the second target entity and the current works is different from the target works, wherein the query result contains the image of the target works, the text of the any information, and the audio of the text of the any information; and acquire, when the type of the query intention is the second type, a text of the any information and an audio of the text of the any information if the works information query instruction contains the first target entity but does not contain the second target entity, wherein the query result includes the text of the any information, and the audio of the text of the any information.

Optionally, the plurality of intention types include a third type, intentions involved in the third type include intentions relevant to play of works, and the processor is configured to: acquire, when the type of the query intention is the third type, an audio for prompting that the current works is the target works if the works information query instruction at least contains the second target entity and the current works is the same as the target works, wherein the query result includes the audio for prompting that the current works is the target works; and acquire, when the type of the query intention is the third type, an image of the target works and an audio for indicating the target works if the works information query instruction at least contains the second target entity and the current works is different from the target works, wherein the query result includes the image of the target works and the audio for indicating the target works.

Optionally, the processor is configured to: determine, when the type of the query intention is the third type, whether an author of the current works is the same as a target author indicated by the first target entity of the query intention if the works information query instruction contains the first target entity but does not contain the second target entity;

acquire an audio for indicating that the current works is the only works of the target author if the author of the current works is the same as the target author and the current works is the only works of the target author, wherein the query result includes the audio for indicating that the current works is the only works of the target author;

acquire an image of first works and an audio for indicating the first works if the author of the current works is the same as the target author and the current works is not the only works of the target author, wherein the first works is any works other than the current works of the target author, and the query result includes the image of the first works and the audio for indicating the first works; and acquire an image of second works and an audio for indicating the second works if the author of the current works is different from the target author, wherein the second works is any works of the target author, and the query result includes the image of the second works and the audio for indicating the second works.

Optionally, the processor is configured to acquire, when the type of the query intention is the third type, an image of third works and an audio for indicating the third works if the works information query instruction does not contain the first target entity or the second target entity, wherein the query result includes the image of the third works and the audio for indicating the third works;

wherein the third works is any works of other authors than the author of the current works if the current works is the only works of the author; and the third works is any works other than the current works of the author of the current works if the current works is not the only works of the author.

Optionally, the processor is configured to acquire the works information query instruction in voice form by voice collection.

Optionally, the works includes a painting.

Optionally, the display device further includes a microphone, and the processor is configured to:

acquire the works information query instruction in voice form by the microphone.

In yet another aspect, there is provided a display device, including:

an instruction acquisition module, configured to acquire a works information query instruction;

an intention identification module, configured to obtain a query intention by performing intention identification on the works information query instruction;

a type determination module, configured to determine a type of the query intention in a plurality of intention types;

an entity detection module, configured to detect whether the works information query instruction contains at least one target entity;

a result acquisition module, configured to acquire a query result according to the query intention and reference information, wherein the reference information includes the type of the query intention and a detection result indicating whether the works information query instruction contains at least one target entity, and the query result includes at least one information of an image, an audio and a text; and an information display module, configured to display the query result.

Optionally, the at least one target entity contains a first target entity containing author information of works and/or a second target entity containing title information of the works.

Optionally, the at least one target entity contains the second target entity, and the display device further includes:

a works detection module, configured to detect, when the works information query instruction contains the second target entity, whether current works displayed by the display device is the same as target works indicated by the second target entity; and the reference information further includes a detection result indicating whether the current works is the same as the target works.

Optionally, the plurality of intention types include a first type, intentions involved in the first type include intentions relevant to introduction of works. The display device further includes:

a to-be-introduced works determination module, configured to determine, when the type of the query intention is the first type, works to be introduced according to the detection result indicating whether the works information query instruction contains the at least one target entity; wherein the works to be introduced is the target works indicated by the second target entity if the works information query instruction at least contains the second target entity, and the works to be introduced is any works of an author indicated by the first target entity if the works information query instruction contains the first target entity but does not contain the second target entity; and an audio detection module, configured to detect whether an audio library contains an introduction audio of the works to be introduced, wherein the reference information further includes a detection result indicating whether the audio library contains the introduction audio of the works to be introduced.

Optionally, the result acquisition module is configured to:

acquire, when the type of the query intention is the first type, the introduction audio in the audio library if the audio library contains the introduction audio, the works information query instruction at least contains the second target entity, and the current works is the same as the target works, wherein the query result includes the introduction audio;

acquire, when the type of the query intention is the first type, an image of the target works and the introduction audio in the audio library if the audio library contains the introduction audio, the works information query instruction at least contains the second target entity and the current works is different from the target works, wherein the query result includes the image of the target works and the introduction audio; and acquire, when the type of the query intention is the first type, the introduction audio in the audio library if the audio library contains the introduction audio and the works information query instruction contains the first target entity but does not contain the second target entity, wherein the query results includes the introduction audio.

Optionally, the result acquisition module is configured to:

acquire, when the type of the query intention is the first type, an introduction text of the works to be introduced and an audio of the introduction text if the audio library does not contain the introduction audio, the works information query instruction at least contains the second target entity, and the current works is the same as the target works, wherein the query result includes the introduction text of the works to be introduced and the audio of the introduction text;

acquire, when the type of the query intention is the first type, an image of the works to be introduced, an introduction text of the works to be introduced and an audio of the introduction text if the audio library does not contain the introduction audio, the works information query instruction at least contains the second target entity and the current works is different from the target works, wherein the query result includes the image of the works to be introduced, the introduction text of the works to be introduced and the audio of the introduction text; and acquire, when the type of the query intention is the first type, an introduction text of the works to be introduced and an audio of the introduction text if the audio library does not contain the introduction audio, and the works information query instruction contains the first target entity but does not contain the second target entity, wherein the query result includes the introduction text of the works to be introduced and the audio of the introduction text.

Optionally, the plurality of intention types include a second type, intentions involved in the second type include intentions relevant to any information of an information group, the information group includes author information, and information of the works other than its introduction, and the result acquisition module is configured to:

acquire, when the type of the query intention is the second type, a text of the any information and an audio of the text of the any information if the works information query instruction at least contains the second target entity and the current works is the same as the target works, wherein the query result includes the text of the any information, and the audio of the text of the any information; and acquire, when the type of the query intention is the second type, an image of the target works, a text of the any information and an audio of the text of the any information if the works information query instruction at least contains the second target entity and the current works is different from the target works, wherein the query result includes the image of the target works, the text of the any information, and the audio of the text of the any information.

The result acquisition module is further configured to:

acquire, when the type of the query intention is the second type, a text of the any information and an audio of the text of the any information if the works information query instruction contains the first target entity but does not contain the second target entity, wherein the query result includes the text of the any information and the audio of the text of the any information.

Optionally, the plurality of intention types include a third type, intentions involved in the third type include intentions relevant to play of works, and the result acquisition module is configured to:

acquire, when the type of the query intention is the third type, an audio for prompting that the current works is the target works if the works information query instruction at least contains the second target entity and the current works is the same as the target works, wherein the query result includes the audio for prompting that the current works is the target works; and acquire, when the type of the query intention is the third type, an image of the target works and an audio for indicating the target works if the works information query instruction at least contains the second target entity and the current works is different from the target works, wherein the query result includes the image of the target works and the audio for indicating the target works.

Optionally, the result acquisition module is further configured to:

determine, when the type of the query intention is the third type, whether an author of the current works is the same as a target author indicated by the first target entity of the query intention if the works information query instruction contains the first target entity but does not contain the second target entity;

acquire an audio for indicating that the current works is the only works of the target author if the author of the current works is the same as the target author and the current works is the only works of the target author, wherein the query result includes the audio for indicating that the current works is the only works of the target author;

acquire an image of first works and an audio for indicating the first works if the author of the current works is the same as the target author and the current works is not the only works of the target author, wherein the first works is any works of the target author other than the current works, and the query result includes the image of the first works and the audio for indicating the first works; and acquire an image of second works and an audio for indicating the second works if the author of the current works is different from the target author, wherein the second works is any works of the target author, and the query result includes the image of the second works and the audio for indicating the second works.

Optionally, the result acquisition module is further configured to:

acquire, when the type of the query intention is the third type, an image of third works and an audio for indicating the third works if the works information query instruction does not contain the first target entity or the second target entity, and the query result includes the image of the third works and the audio for indicating the third works;

wherein the third works is any works of other authors than the author of the current works if the current works is the only works of the author; and the third works is any works of the author of the current works other than the current works if the current works is not the only works of the author.

Optionally, the instruction acquisition module includes:

an audio collection module configured to acquire the works information query instruction in voice form by voice collection.

Optionally, the works includes a painting.

In still yet another aspect, there is provided a display device, including a microphone, a speaker, a display screen and a processor. The processor is connected to the microphone, the speaker and the display screen; and the processor is configured to receive a works information query instruction by the microphone and to perform, according to the works information query instruction, at least one of following operations:

controlling the speaker to play a voice that is relevant to the content to be queried by the works information query instruction; and controlling the display screen to display at least one of an image and a text that are both relevant to the content to be queried by the works information query instruction.

Optionally, the processor is configured to determine an image to be displayed according to the works information query instruction, and to control the display screen to display the image to be displayed when a current image displayed by the display screen is different from the image to be displayed.

Optionally, the processor is configured to determine an image to be displayed according to the works information query instruction, and to control the speaker to play a voice for prompting that the current image is the same as the image to be displayed when the current image displayed by the display screen is the same as the image to be displayed.

DETAILED DESCRIPTION

For clearer descriptions of the objectives, technical solutions and advantages of the present disclosure, the embodiments of the present disclosure will be described in further detail below with reference to the accompanying drawings.

Although various display devices have emerged with the development of display technologies, the functions of the display devices are still relatively simple at present. An embodiment of the present disclosure provides a display device having rich functions.

Figure 1:
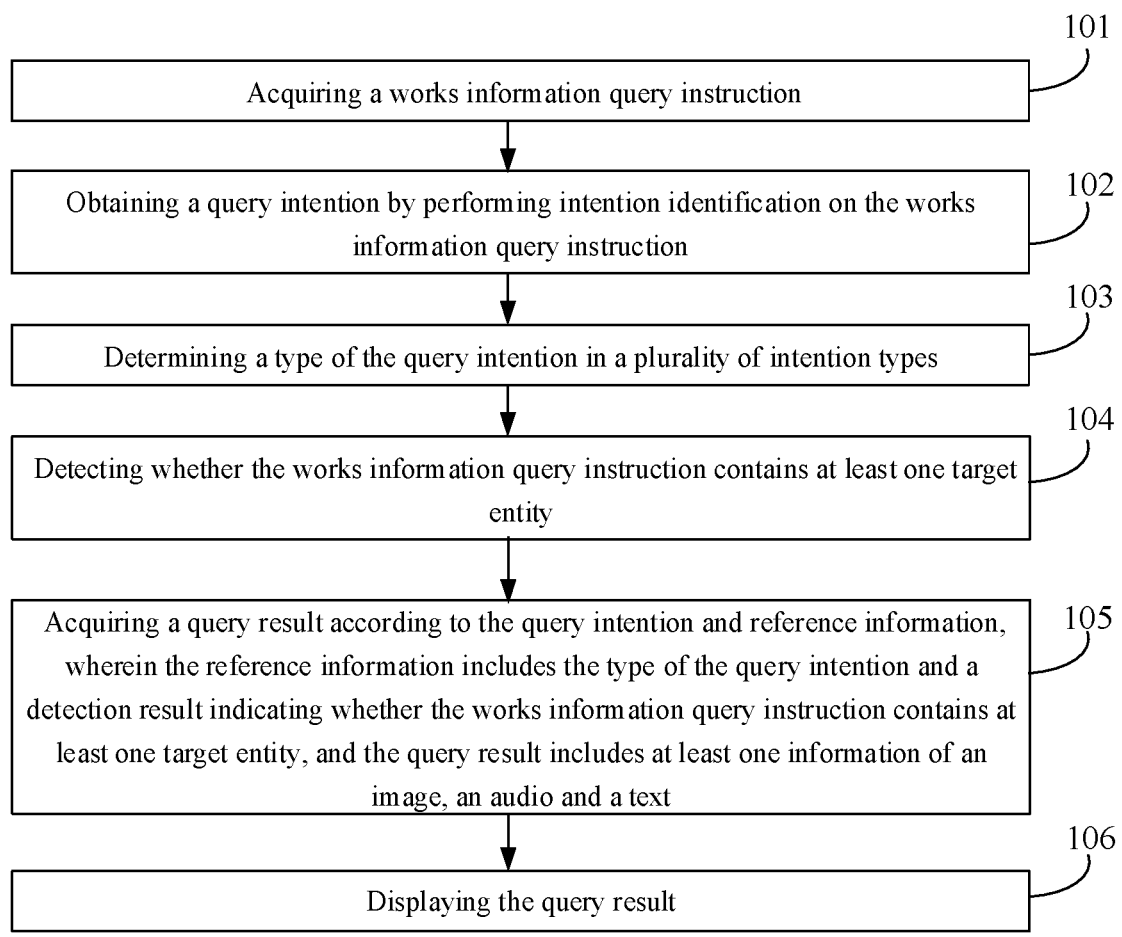
FIG. 1 is a flow chart of a method for querying information for a display device according to an embodiment of the present disclosure.

Exemplarily, FIG. 1 is a flow chart of a method for querying information query method for a display device according to an embodiment of the present disclosure. The present embodiment takes a fact that the display device is an electronic painting screen as an example. Optionally, the display device may also be a television, an air conditioner having a display function, and the like. As shown in FIG. 1, the method for querying information may include the following steps.

In step 101, a works information query instruction is acquired.

In step 102, a query intention is obtained by performing intention identification on the works information query instruction.

In step 103, a type of the query intention in a plurality of intention types is determined.

In step 104, whether the works information query instruction contains at least one target entity is detected.

In step 105, a query result is acquired according to the query intention and reference information. The reference information includes the type of the query intention and a detection result indicating whether the works information query instruction contains at least one target entity. The query result includes at least one information of an image, an audio, and a text.

In step 106, the query result is displayed.

In summary, according to the method for querying information provided by the present embodiment, after acquiring the works information query instruction, the display device may determine the type of the query intention and obtain the detection result indicating whether the works information query instruction contains at least one target entity. Moreover, the display device may acquire and display the query result based on the reference information, which includes the type of the query intention and the detection result indicating whether the works information query instruction contains at least one target entity. In this way, the display device provided by the present embodiment can implement information query based on the reference information, thereby enriching functions of the display device.

Figure 2:
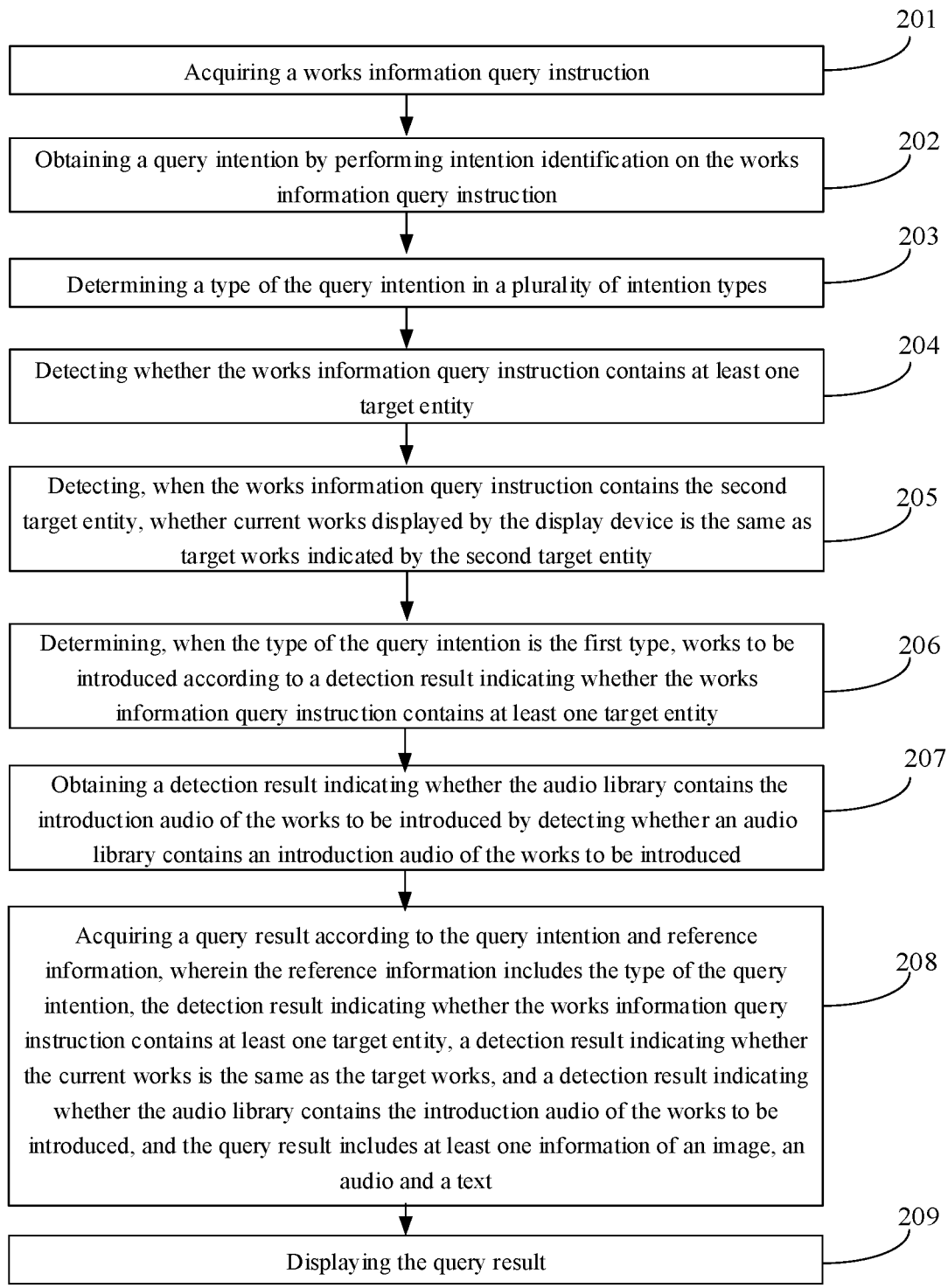
FIG. 2 is a flow chart of another method for querying information for a display device according to an embodiment of the present disclosure.

Exemplarily, FIG. 2 is a flow chart of another method for querying information for a display device according to an embodiment of the present disclosure. In the present embodiment, the display device takes a fact that the display device is an electronic painting screen as an example. Optionally, the display device may also be a television, an air conditioner having a display function, and the like. In addition, the present embodiment takes a fact that the works is a painting as an example. Optionally, the works may not be a painting (such as music works and film and television works). As shown in FIG. 2, the method for querying information may include the following steps:

In step 201, a works information query instruction is acquired.

The works information query instruction may be voice collected by the display device during the speaking of a user.

Optionally, the display device may be provided with a query button (or a query button is displayed). The display device may collect the user's voice when the user clicks the query button so as to acquire the works information query instruction. The display device includes a processor and a microphone. In step 201, the processor may acquire the works information query instruction by the microphone.

In step 202, a query intention is obtained by performing intention identification on the works information query instruction.

After the display device acquires the works information query instruction, the intention identification needs to be performed on the works information query instruction. Exemplarily, an intention identification model may be stored in the display device, and the display device may perform intention identification on the works information query instruction by the intention identification model.

Optionally, the intention identification model may be based on a traditional machine learning algorithm or deep learning algorithm. The traditional machine learning algorithm may be, e.g., support vector machine (SVM), and the deep learning algorithm may be, e.g., convolutional neural networks (CNN), long short-term memory network (LSTM) or region-based convolutional neural networks (RCNN).

Exemplarily, in the present embodiment, the display device performs intention identification on various works information query instructions, and the identified query intentions may be shown in Table 1. It should be noted that the query intention identified by the display device may be reflected by basic intentions and slots in Table 1. One basic intention and one slot may reflect one query intention. It is assumed that the display device identifies the basic intention "author's nationality" and the slot "author's name", corresponding to the serial number 1 in Table 1, the query intention identified by the display device is to query the nationality of the "author' name". It is assumed that the display device identifies the basic intention "inquire introduction of works" and the slot "tile of works", corresponding to the serial number 22 in Table 1, the query intention identified by the display device is to query the introduction of the "title of works". Exemplarily, the works information query instruction collected by the display device in step 201 may be "introduce xxx of xx", where "xx" represents author's name and "xxxx" represents one painting of the author. In this way, the query intention identified by the display device may be composed of "inquire introduction of works" and "title of works" (xxxx) corresponding to the serial number 22 in Table 1, for example, it may be "inquire introduction of xxxx".

It should be noted that Table 1 shows 25 different query intentions in total. The query intentions that may be identified by the display device in the present embodiment are not limited to these 25 query intentions.

Optionally, the display device may also acquire the serial number of the query intention when performing intention identification on the works information query instruction to obtain the query intention. For example, the display device may acquire the corresponding serial number of the query intention in Table 1.

Optionally, the intention identification model may obtain not only the above query intention but also at least one slot when the display device performs intention identification on the works information query instruction. For example, it is assumed that the query intention identified by the display device is the query intention "author's nationality" of the serial number 1 in Table 1, the slot obtained by the display device may include "author's name"; and it is assumed that the query intention identified by the display device is the query intention "inquire introduction of works", the slot obtained by the display device may include "title of works".

TABLE 1

| Serial Number | Basic Intention | Slot |
| --- | --- | --- |
| 1 | Author's nationality | Author's name |
| 2 | Author's place of birth | Author's name |
| 3 | Inquire author's name | Author's name |
| 4 | Inquire author's first famous works | Author's name |
| 5 | Author's representative works | Author's name |
| 6 | Author's genre and style | Author's name |
| 7 | Author's achievement | Author's name |
| 8 | Inquire introduction of author | Author's name |
| 9 | Author's most expensive painting | Author's name |
| 10 | Like authors | Author's name |
| 11 | Inquire tile of works | Title of works |
| 12 | School and style of painting | Title of works |
| 13 | Category of painting, drawing method and creation way | Title of works |
| 14 | Creation site of painting | Title of works |
| 15 | Time of creation | Title of works |
| 16 | Content and tone of painting | Title of works |
| 17 | Collection site | Title of works |
| 18 | Inspiration of creation | Title of works |
| 19 | Price | Title of works |
| 20 | Status of works | Title of works |
| 21 | Highlights of works | Title of works |
| 22 | Inquire introduction of works | Title of works |
| 23 | Play on demand | Title of works and Author's name (or Author's name, or N/A) |
| 24 | The previous | N/A |
| 25 | The next | N/A |

In step 203, a type of the query intention in a plurality of intention types is determined.

Optionally, after determining the query intention, the display device may determine the type of the query intention in the plurality of intention types. For example, the display device may search for the intention type corresponding to the query intention in a correspondence between a plurality of intentions and the plurality of intention types, and then determine the intention type as the type of the query intention.

Optionally, if the display device acquires the serial number of the identified query intention in step 202, the display device may also search for the intention type corresponding to the serial number of the query intention in a correspondence between a plurality of intention numbers and the plurality of intention types in step 203, and then determine the intention type as the type of the query intention.

In step 204, whether the works information query instruction contains at least one target entity is detected.

Exemplarily, the at least one target entity contains a first target entity and/or a second target entity. The present embodiment takes a fact that the at least one target entity contains the first target entity and the second target entity as an example. The first target entity contains author's information of the works, and the second target entity contains information of the title of the works.

It should be noted that the works information query instruction is used for querying something, such as certain works, or a certain author, or others. The entities of the works information query instruction may include something queried by the query intention. In step 204, the display device needs to analyze the works information query instruction (or the query intention of the works information query instruction) to determine whether the works information query instruction contains the first target entity and whether the works information query instruction contains the second target entity.

Optionally, the display device may only detect whether the works information query instruction contains the first target entity or the second target entity, or other entities, which will not be limited in the embodiments of the present disclosure.

In step 205, whether current works displayed by the display device is the same as target works indicated by the second target entity is detected when the works information query instruction contains the second target entity.

Optionally, when a detection result, obtained in step 204, indicating whether the works information query instruction contains at least one target entity indicates that the works information query instruction contains the second target entity, the display device may further detect whether the current works displayed by the display device is the same as the target works indicated by the second target entity to obtain a detection result indicating whether the current works is the same as the target works. In this way, the reference information based on which a query result is acquired in the subsequent step 208 may further include the detection result indicating whether the current works is the same as the target works.

In step 206, when the type of the query intention is a first type, works to be introduced is determined according to the detection result indicating whether the works information query instruction contains at least one target entity.

The works to be introduced is the target works indicated by the second target entity if the works information query instruction at least contains the second target entity; and the works to be introduced is any works of an author indicated by the first target entity if the works information query instruction contains the first target entity but does not contain the second target entity.

In step 207, whether an audio library contains an introduction audio of the works to be introduced is detected to obtain a detection result indicating whether the audio library contains the introduction audio of the works to be introduced.

Optionally, if the type of the query intention, determined in step 203, is the first type (intentions involved in the first type include intentions relevant to introduction of works), the display device may further determine the works to be introduced, and then determine whether a preset audio library contains the introduction audio of the works to be introduced, so as to obtain the detection result indicating whether the audio library contains the introduction audio of the works to be introduced. In this way, the reference information based on which the query result is acquired in the subsequent step 208 may further include the detection result indicating whether the current works is the same as the target works.

In step 208, a query result is acquired based on the query intention and the reference information. The reference information includes the type of the query intention, the detection result indicating whether the works information query instruction contains at least one target entity, and the detection result indicating whether the current works is the same as the target works, and the detection result indicating whether the audio library contains the introduction audio of the works to be introduced. The query result includes at least one information of an image, an audio and a text.

In step 209, the query result is d.

Exemplarily, the display device needs to display an image (for example, the processor in the display device controls the display screen in the display device to display the image) when the query result includes the image; the display device needs to play an audio (for example, the processor in the display device controls the speaker in the display device to play the audio) when the query result includes the audio; and the display device needs to display a text (for example, the processor in the display device controls the display screen in the display device to display the text) when the query result includes the text.

It should be noted that the plurality of intention types in step 203 may include various intention types. Embodiments of the present disclosure will take at least one of the first type, the second type and the third type as an example to explain the steps in the embodiments described above. Optionally, the plurality of intention types in step 203 may also be other intention types, which will not be limited in the embodiments of the present disclosure.

Exemplarily, intentions of the first type include intentions relevant to introduction of the works. For example, the query intention composed of the basic intention and the slot corresponding to the serial number 22 in Table 1 is the intention of the first type.

Intentions of the second type include intention relevant to any information in an information group. The information group includes author's information, and works information other than its introduction (such as price and collection site of works). For example, the query intentions composed of the basic intentions and the slots corresponding to the serial numbers 1 to 22 in Table 1 are all intentions of the second type.

Intentions of the third type include intentions relevant to play of works. For example, the query intention composed of the basic intention and the slot corresponding to the serial number 23 in Table 1 is the intention of the third type.

The process of step 208 will be explained below when the type of the query intention is the first type, the second type, and the third type respectively.

In a first aspect, when the type of the query intention in the reference information is the first type, step 208 may include the following sub-steps.

In a first case, if the audio library contains the introduction audio of the works to be introduced, the works information query instruction at least contains the second target entity, and the current works is the same as the target works, then the introduction audio of the works to be introduced in the audio library is acquired. In this way, the query result includes the introduction audio.

It should be noted that the audio library may be configured to store a pre-recorded introduction audio of at least one works. When the type of the query intention is the first type, it means that the query intention intends to query the introduction of the works to be introduced, so it is necessary to detect whether the audio library contains the introduction audio of the works to be introduced. Moreover, at this time, the query intention needs to contain at least the second target entity (for example, the query intention contains only the second target entity, or the query intention contains the second target entity and the first target entity). If the current works displayed by the display device is the same as the target works (i.e., the works to be introduced) indicated by the second target entity, the display device does not need to acquire the image of the target works. Therefore, when the audio library contains the introduction audio of the works to be introduced, the works information query instruction at least contains the second target entity, and the current works is the same as the target works, then the display device needs to acquire only the introduction audio of the works to be introduced (i.e., the target works) in the audio library, and does not need to acquire the image or the text. In this way, in step 209, the display device only needs to play the acquired introduction audio without changing the currently displayed works. For example, if the query intention is "introduce works A", the display device currently displays works A, and the audio library contains the introduction audio of works A, the display device only needs to acquire the introduction audio of works A in the audio library in step 208.

In a second case, if the audio library contains the introduction audio of the works to be introduced, the works information query instruction at least contains the second target entity, and the current works is different from the target works, then the image of the target works and the introduction audio of the works to be introduced in the audio library are acquired. In this way, the query result includes the image of the target works and the introduction audio.

It should be noted that when the type of the query intention is the first type, if the audio library contains the introduction audio of the works to be introduced, the works information query instruction at least contains the second target entity, and the current works is different from the target works, it means that the works to be introduced is not the works currently displayed by the display device. Therefore, the display device needs to acquire the introduction audio of the works to be introduced in the audio library and the image of the works to be introduced (i.e., the target works), and does not need to acquire the text. In this way, in step 209, the display device needs to not only play the acquired introduction audio, but also replace the currently displayed works with the works to be introduced. For example, if the query intention is "introduce works A", the display device does not display works A at present, and the audio library contains the introduction audio of works A, the display device needs to acquire the introduction audio of works A in the audio library and works A in step 208.

In a third case, if the audio library contains the introduction audio of the works to be introduced, and the works information query instruction contains the first target entity but does not contain the second target entity, then the introduction audio of the works to be introduced in the audio library is acquired. In this way, the query result includes the introduction audio.

It should be noted that when the type of the query intention is the first type, in the third case, only the introduction audio of the works to be introduced in the audio library needs to be acquired, and the image and the text do not need to be acquired. For example, if the query intention is "introduce works of author B", the display device may determine any works of author B as the works to be introduced. Besides, if the query intention contains the first target entity "author B" and the audio library contains the introduction audio of the works to be introduced, the display device only needs to acquire the audio of the works to be introduced from the audio library.

In a fourth case, if the audio library does not contain the introduction audio of the works to be introduced, the works information query instruction at least contains the second target entity, and the current works is the same as the target works, then the introduction text of the works to be introduced and the audio of the introduction text are acquired. In this way, the query result includes the introduction text of the works to be introduced, and the audio of the introduction text.

It should be noted that when the type of the query intention is the first type, if the audio library does not contain the introduction audio of the works to be introduced, it means that the pre-recorded introduction audio of the works does not include the introduction audio of the works to be introduced. Therefore, in the fourth case, the display device needs to acquire the introduction text of the works to be introduced and the audio of the introduction text, and does not need to acquire the image. Exemplarily, the audio of the introduction text may also be acquired by converting the introduction text into the audio after the display device acquires the introduction text, which will not be limited in the embodiments of the present disclosure. For example, if the query intention is "introduce works of author B", the display device may determine any works of author B as works to be introduced. Besides, if the query intention contains the first target entity "author B" and the audio library does not contain the introduction audio of the works to be introduced, the display device needs to acquire the introduction text of the works to be introduced and the audio of the introduction text.

In a fifth case, if the audio library does not contain the introduction audio of the works to be introduced, the works information query instruction at least contains the second target entity, and the current works is different from the target works, then the works to be introduced and its introduction text, as well as the audio of the introduction text, are acquired. In this way, the query result includes the image of the works to be introduced, the introduction text of the works to be introduced, and the audio of the introduction text.

It should be noted that when the type of the query intention is the first type, in the fifth case, if the current works displayed by the display device is not the same as the target works, the display device needs to acquire not only the introduction text of the works to be introduced and the audio of the introduction text but also the image of the works to be displayed (i.e., the target works). For example, if the query intention is "introduce work A", the display device may determine that the query intention contains the second target entity "work A"; if the audio library does not contain the introduction audio of works A, and the display device does not display works A at present, the display device needs to acquire not only the introduction text of works A and the audio of the introduction text but also the image of works A.

In a sixth case, if the audio library does not contain the introduction audio of the works to be introduced and the works information query instruction contains the first target entity but does not contain the second target entity, then the introduction text of the works to be introduced and the audio of the introduction text are acquired. In this way, the query result includes the introduction text of the works to be introduced, and the audio of the introduction text.

It should be noted that when the type of the query intention is the first type, in the sixth case, only the introduction text of the works to be introduced and the audio of the introduction text needs to be acquired, and the image does not need to be acquired. For example, if the query intention is "introduce works of author B", the display device may determine any works of author B as the works to be introduced. Besides, if the query intention contains the first target entity "author B", and the audio library does not contain the introduction audio of the works to be introduced, the display device acquires the introduction text of the works to be introduced, and the audio of the introduction text.

Optionally, the embodiments of the present disclosure do not limit the sequential order of the steps of the method. Exemplarily, when the display device determines that the type of the query intention is the first type in step 203, the display device may perform steps 206 and 207 first, and steps 204 and 205 later. After step 205, the display device may determine which of the above six cases the current situation is according to the determination result in the previous steps, and then acquire the information that needs to be acquired in this case.

In a second aspect, when the type of the query intention in the reference information is the second type, intentions of the second type intends to query any information in the information group. The information group includes author's information, and information of works other than its introduction. At this time, the above step 208 may include the following sub-steps.

In a first case, if the works information query instruction at least contains the second target entity, and the current works is the same as the target works, then a text of the any information and an audio of the text of the any information are acquired. The query result includes the text of the any information, and the audio of the text of the any information.

It should be noted that when the type of the query intention is the second type, in the first case, if the works that the user wants to query is the same as the works currently displayed by the display device, the display device needs to acquire only the text and the audio of the any information that the query intention needs to query, and does not need to acquire the image. For example, if the query intention is "what is the price of works A", the display device may determine that the works information query instruction contains the second target entity "works A" and the any information that the query intention needs to query is "price of works A". If the display device currently displays works A, the display device needs to acquire a text and an audio of the price of works A.

In a second case, if the works information query instruction at least contains the second target entity, and the current works is different from the target works, then the image of the target works, the text of the any information and the audio of the text of the any information are acquired. In this way, the query result includes the image of the target works, the text of the any information, and the audio of the text of the any information.

It should be noted that when the type of the query intention is the second type, in the second case, if the target works that the user wants to query is not the same as the works currently displayed by the display device, the display device needs to acquire not only the text and the audio of the any information that the query intention needs to query but also the image of the target works. For example, if the query intention is "what is the price of works A", the display device may determine that the works information query instruction contains the second target entity "works A", and the any information that the query intention needs to query is "price of works A". If the display device does not currently display works A, the display device needs to acquire the image of works A, and the text and the audio of the price of works A.

In a third case, if the works information query instruction contains the first target entity but does not contain the second target entity, the text of any information and the audio of the text of any information are acquired. In this way, the query result includes the text of the any information, and the audio of the text of the any information.

It should be noted that when the type of the query intention is the second type, in the third case, if the information that the user needs to query is author's information, the display device may directly acquire only the text and the audio of the information that the query intention wants to query but not acquire the image. For example, if the query intention is "how old is author B", the display device may determine that the works information query instruction contains the first target entity "author B", and the any information that the query intention needs to query is "author B' Age". The display device needs to acquire the text and the audio of author B's age.

Optionally, the embodiments of the present disclosure do not limit the sequential order of the steps of the method. Exemplarily, when the display device determines that the type of the query intention is the second type in step 203, the display device may sequentially perform steps 204 and 205, and does not need to perform step 206 or step 207. After step 205, the display device may determine which of the above three cases the current situation is according to the determination result in the previous steps, and then acquire the information that needs to be acquired in this case.

In a third aspect, intentions of the third type intend to play works. When the type of the query intention in the reference information is the third type, the above step 208 may include the following sub-steps.

In a first case, if the works information query instruction at least contains the second target entity, and the current works is the same as the target works, then an audio for prompting that the current works is the target works is acquired. At this time, the query result includes the audio for prompting that the current works is the target works.

It should be noted that when the type of the query intention is the third type, the query intention is configured to play the works. At this time, if the works information query instruction contains the second target entity and the target works indicated by the second target entity is the current works displayed by the display device, the display device may determine that the works that the user wants to play at present is the current works displayed by the display device. Therefore, the display device needs to acquire the audio for prompting that the current works is the target works (for example: "this is the painting you are looking for"). In this case, the display device does not need to acquire an image or a text.

In a second case, if the works information query instruction at least contains the second target entity and the current works is different from the target works, then an image of the target works and an audio for indicating the target works are acquired. In this way, the query result includes the image of the target works and the audio for indicating the target works.

It should be noted that when the type of the query intention is the third type, the query intention is configured to play the works. At this time, if the works information query instruction contains the second target entity, and the target works indicated by the second target entity is different from the current works displayed by the display device, the display device may determine the target works that the user wants to play at present. Therefore, the display device needs to acquire the image of the target works and the audio for prompting the target works (for example, if the target works is works A and the author of works A is author B, the audio may be "recommend works A for you" or "recommend works A of author B for you"). In this case, the display device does not need to acquire a text. Moreover, in step 209, the display device needs to display the acquired image of the target works.

If the works information query instruction contains the first target entity but does not contain the second target entity, whether the author of the current works is the same as the target author indicated by the first target entity of the query intention is determined. It can be seen that when the query intention only contains the first target entity, the query intention is configured to query the works of the target author indicated by the first target entity. At this time, the display device needs to determine whether the author of the displayed current works is the same as the target author.

In a third case, if the works information query instruction contains the first target entity but does not contain the second target entity, the author of the current works is the same as the target author, and the current works is the only works of the target author, it indicates that the current works displayed by the display device is the only works of the target author that the query intention is intended to query. Therefore, the display device needs to acquire the audio for indicating that the current works is the only works of the target author. For example, "the currently displayed works is the only works of the target author". In this way, the query result includes the audio for indicating that the current works is the only works of the target author.

In a fourth case, if the works information query instruction contains the first target entity but does not contain the second target entity, the author of the current works is the same as the target author, and the current works is not the only works of the target author, it indicates that the target author owns other works in addition to the current works. Therefore, the display device may acquire an image of first works and an audio for indicating the first works. The first works is any works other than the current works of the target author. Optionally, the display device may randomly select any one of the works of the target author in a works library containing a plurality of works (e.g., 300 works and 400 works). For example, author B owns works A and works C, and the current works displayed by the display device is works A, the display device may acquire the image of works C and the audio for indicating works C (e.g., recommend works C of author B for you) if the query intention merely contains the first target entity "author B". In this way, the query result includes the image of the first works, and the audio for indicating the first works.

In a fifth case, if the works information query instruction contains the first target entity but does not contain the second target entity, and the author of the current works is different from the target author, it indicates that the query intention is configured to query works of an author who is not the author of the current works. At this time, the display device may acquire an image of second works and an audio for indicating the second works, and the second works is any works of the target author. Exemplarily, it is assumed that the display device currently displays works A of author B, and the first target entity contained by the works information query instruction is "author D", the display device may acquire an image of any works E of author D and an audio for indicating works E. In this way, the query result includes the image of the second works, and the audio for indicating the second works.

In a sixth case, if the works information query instruction does not contain the first target entity or the second target entity, an image of third works and an audio for indicating the third works are acquired. In this way, the query result includes the image of the third works, and the audio for indicating the third works.

When the current works is the only works of the author, the third works is any works of other authors than the author of the current works; and when the current works is not the only works of the author, the third works is any works of the author of the current works other than the current works. Optionally, the display device may randomly select the third works from a works library containing a plurality of works (e.g., 300 works and 400 works). It should be noted that when the query intention does not contain the first target entity or the second target entity, it indicates that the query intention is only intended to play any works. At this time, the display device may preferably display the works of the author of the current works for the user. Therefore, when the current works is not the only works of the author, the display device needs to acquire other works of the author and their audios; and when the current works is the only works of the author, i.e., the author owns no other works than the current works, the display device may acquire images of the works of other authors.

Optionally, the embodiments of the present disclosure do not limit the sequential order of the steps of the method. Exemplarily, when the display device determines that the type of the query intention is the third type in step 203, the display device may sequentially perform steps 204 and 205, and does not need to perform step 206 or step 207. After step 205, the display device may determine which of the above six cases the current situation is according to the determination result in the previous steps, and then acquire the information that needs to be acquired in this case.

It should be noted that the embodiments of the present disclosure take a fact that the steps of the method are independently performed by the display device as an example. Optionally, some or all of the steps may also be performed by the display device via other apparatuses. For example, step 202 may be performed by the display device via an intention identification server. For example, steps 203 to 208 may be performed by the display device via a business server. Optionally, when the display device executes steps 203 and 208 via the intention identification server, the business server may directly acquire the query result locally on the business server and may also acquire the query result on other servers, which will not be limited by the embodiments of the present disclosure.

Exemplarily, the works information query instruction may be an instruction invoice form. After acquiring the works information query instruction, the display device may send the works information query instruction to a semantic comprehension server. The semantic comprehension server first converts the works information query instruction in voice form into a works information query instruction in text form, and then sends the works information query instruction in text form to the display device. After that, the display device may send the works information query instruction in text form to the business server, and the business server may first send the works information query instruction to the intention identification server. After receiving the works information query instruction, the intention identification server performs intention identification on the works information query instruction to obtain the query intention. Afterwards, the intention identification server sends the query intention to the business server, and the business server executes the above steps 203 to 208 according to the query intention to obtain the query result. Then, the business server sends the query result to the display device, and the display device displays the query result.

Optionally, when acquiring the query result, the business server may search for images and audios from a database stored in a data server, and the database may include the above audio library and the above works library. Certainly, the business server may also query images, audios and texts in other locations. After querying the texts, the business server may also generate audios of the texts by the semantic comprehension server.

The foregoing embodiment takes a fact that the business server directly sends the query result to the display device as an example. Optionally, the business server may also send information of the query result to the display device. After receiving the information of the query result, the display device may acquire the query result based on the information. For example, the business server may send a link of the image to the display device, and the display device may acquire the image based on the link after receiving the link of the image. For example, the business server may send a text to the display device, and the display device may generate an audio of the text by the semantic comprehension server after receiving the text.

Optionally, the query intention may also be a control intention for controlling the display device to display the previous or next painting, such as the query intention composed of the basic intentions and the slots corresponding to the serial numbers 24 and 25 in Table 1. When the query intention is the control intention, the display device may directly perform an action of the control intention to be executed without performing the above steps 203 to 209. For example, the display device may directly display the previous painting when the query intention is the query intention composed of the basic intention and the slot corresponding to the serial number 24; and the display device may directly display the next painting when the query intention is the query intention composed of the basic intention and the slot corresponding to the serial number 25.

In summary, according to the method for querying information provided by the present embodiment, after acquiring the works information query instruction, the display device may determine the type of the query intention and obtain the detection result indicating whether the works information query instruction contains at least one target entity. Moreover, the display device may acquire and display the query result based on the reference information, which includes the type of the query intention and the detection result indicating whether the works information query instruction contains at least one target entity. In this way, the display device provided by the present embodiment can implement information query based on the reference information, thereby enriching functions of the display device.

Figure 3:
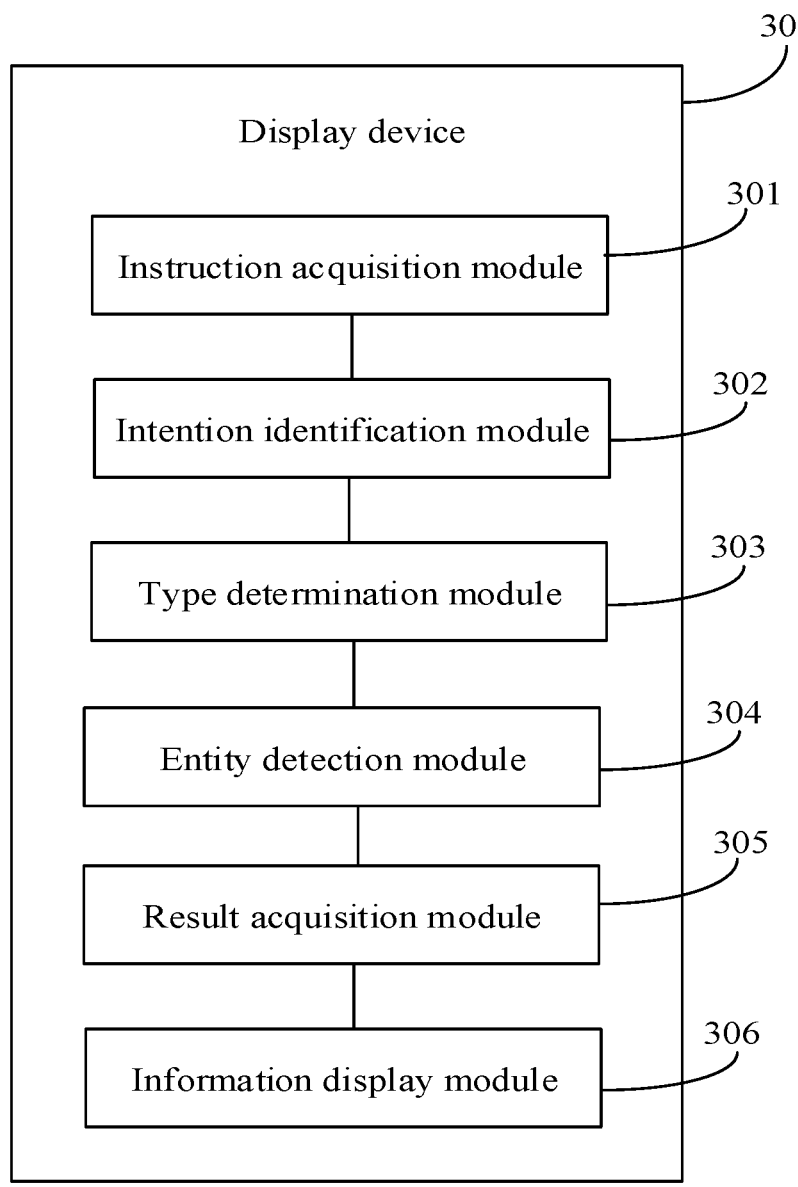
FIG. 3 is a schematic structural diagram of a display device according to an embodiment of the present disclosure.

FIG. 3 is a schematic structural diagram of a display device according to an embodiment of the present disclosure. The present embodiment takes a fact that the display device is an electronic painting screen as an example. Optionally, the display device may also be a television, an air conditioner having a display function, and the like. As shown in FIG. 3, the display device 30 may include:

an instruction acquisition module 301, configured to acquire a works information query instruction;

an intention identification module 302, configured to obtain a query intention by performing intention identification on the works information query instruction;

a type determination module 303, configured to determine a type of the query intention in a plurality of intention types;

an entity detection module 304, configured to detect whether the works information query instruction contains at least one target entity;

a result acquisition module 305, configured to acquire a query result according to the query intention and reference information, wherein the reference information includes the type of the query intention and a detection result indicating whether the works information query instruction contains at least one target entity, and the query result includes at least one information of an image, an audio and a text; and an information display module 306, configured to display the query result.

In summary, according to the display device provided by the present embodiment, the type determination module may determine the type of the query intention after the instruction acquisition module acquires the works information query instruction, and the entity detection module may detect the detection result indicating whether the works information query instruction contains at least one target entity. Moreover, the result acquisition module may acquire and display the query result based on the reference information, which includes the type of the query intention and the detection result indicating whether the works information query instruction contains at least one target entity. In this way, the display device provided by the present embodiment can implement information query based on the reference information, thereby enriching functions of the display device.

Optionally, the at least one target entity contains a first target entity containing author information of works and/or a second target entity containing title information of the works.

Figure 4:
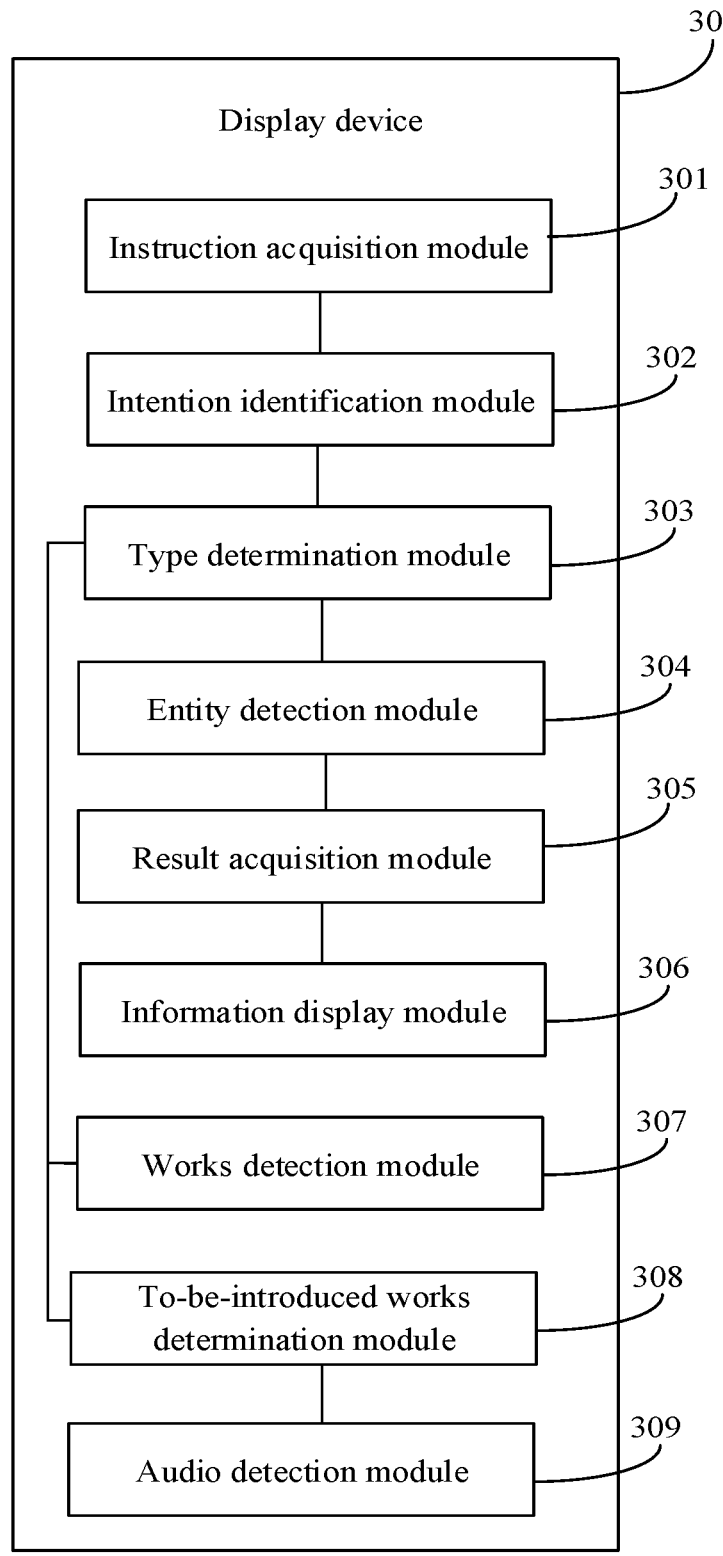
FIG. 4 is a schematic structural diagram of another display device according to an embodiment of the present disclosure.

Optionally, FIG. 4 is a schematic structural diagram of another display device according to an embodiment of the present disclosure. As shown in FIG. 4, based on FIG. 3, the display device 30 may further include:

a works detection module 307, configured to detect whether current works displayed by the display device is the same as target works indicated by the second target entity when the works information query instruction contains the second target entity. The reference information further includes a detection result indicating whether the current works is the same as the target works.

Optionally, the plurality of intention types include a first type. Intentions involved in the first type include intentions relevant to introduction of the works. As shown in FIG. 4, the display device 30 further includes:

a to-be-introduced works determination module 308, configured to determine, when the type of the query intention is the first type, works to be introduced according to the detection result indicating whether the works information query instruction contains at least one target entity, wherein the works to be introduced is the target works indicated by the second target entity if the works information query instruction at least contains the second target entity; and the works to be introduced is any works of an author indicated by the first target entity if the works information query instruction contains the first target entity but does not contain the second target entity; and an audio detection module 309, configured to detect whether an audio library contains an introduction audio of the works to be introduced, wherein the reference information further includes a detection result indicating whether the audio library contains the introduction audio of the works to be introduced.

Optionally, the result acquisition module 306 is configured to:

acquire, when the type of the query intention is the first type, the introduction audio in the audio library if the audio library contains the introduction audio, the works information query instruction at least contains the second target entity, and the current works is the same as the target works, wherein the query result includes the introduction audio;

acquire, when the type of the query intention is the first type, an image of the target works and the introduction audio in the audio library if the audio library contains the introduction audio, the works information query instruction at least contains the second target entity and the current works is different from the target works, wherein the query result includes the image of the target works and the introduction audio; and acquire, when the type of the query intention is the first type, the introduction audio in the audio library if the audio library contains the introduction audio and the works information query instruction contains the first target entity but does not contain the second target entity, wherein the query results includes the introduction audio.

Optionally, the result acquisition module 306 is configured to:

acquire, when the type of the query intention is the first type, an introduction text of the works to be introduced and an audio of the introduction text if the audio library does not contain the introduction audio, the works information query instruction at least contains the second target entity and the current works is the same as the target works, wherein the query result includes the introduction text of the works to be introduced and the audio of the introduction text;

acquire, when the type of the query intention is the first type, an image of the works to be introduced, an introduction text of the works to be introduced and an audio of the introduction text if the audio library does not contain the introduction audio, the works information query instruction at least contains the second target entity and the current works is different from the target works, wherein the query result includes the image of the works to be introduced, the introduction text of the works to be introduced and the audio of the introduction text; and acquire, when the type of the query intention is the first type, an introduction text of the works to be introduced and an audio of the introduction text if the audio library does not contain the introduction audio and the works information query instruction contains the first target entity but does not contain the second target entity, wherein the query result includes the introduction text of the works to be introduced and the audio of the introduction text;

Optionally, the plurality of intention types include a second type. Intentions involved in the second type include intentions relevant to any information of an information group. The information group includes author information, and information of the works other than its introduction.

Optionally, the result acquisition module 306 is configured to:

acquire, when the type of the query intention is the second type, a text of any information and an audio of the text of the any information if the works information query instruction at least contains the second target entity and the current works is the same as the target works, wherein the query result includes the text of the any information, and the audio of the text of the any information; and acquire, when the type of the query intention is the second type, an image of the target works, a text of the any information and an audio of the text of the any information if the works information query instruction at least contains the second target entity and the current works is different from the target works, wherein the query result includes the image of the target works, the text of the any information, and the audio of the text of the any information.

Optionally, the result acquisition module 306 is configured to:

acquire, when the type of the query intention is the second type, a text of any information and an audio of the text of the any information if the works information query instruction contains the first target entity but does not contain the second target entity, wherein the query result includes the text of the any information and the audio of the text of the any information.

Optionally, the plurality of intention types include a third type. Intentions involved in the third type include intentions relevant to play of works. The result acquisition module 306 is configured to:

acquire, when the type of the query intention is the third type, an audio for prompting that the current works is the target works if the works information query instruction at least contains the second target entity and the current works is the same as the target works, wherein the query result includes the audio for prompting that the current works is the target works; and acquire, when the type of the query intention is the third type, an image of the target works and an audio for indicating the target works if the works information query instruction at least contains the second target entity and the current works is different from the target works, wherein the query result includes the image of the target works and the audio for indicating the target works.

Optionally, the result acquisition module 306 is configured to:

determine, when the type of the query intention is the third type, whether an author of the current works is the same as a target author indicated by the first target entity of the query intention if the works information query instruction contains the first target entity but does not contain the second target entity;

acquire an audio for indicating that the current works is the only works of the target author if the author of the current works is the same as the target author and the current works is the only works of the target author, wherein the query result includes the audio for indicating that the current works is the only works of the target author;

acquire an image of first works and an audio for indicating the first works if the author of the current works is the same as the target author and the current works is not the only works of the target author, wherein the first works is any works other than the current works of the target author, and the query result includes the image of the first works and the audio for indicating the first works; and acquire an image of second works and an audio for indicating the second works if the author of the current works is different from the target author, wherein the second works is any works of the target author, and the query result includes the image of the second works and the audio for indicating the second works.

Optionally, the result acquisition module 306 is configured to:

acquire, when the type of the query intention is the third type, an image of third works and an audio for indicating the third works if the works information query instruction does not contain the first target entity or the second target entity, and the query result includes the image of the third works and the audio for indicating the third works.

The third works is any works of other authors than the author of the current works if the current works is the only works of the author; and the third works is any works of the author of the current works other than the current works if the current works is not the only works of the author.

Optionally, the instruction acquisition module 301 may include an audio collection module configured to acquire the works information query instruction in voice form by voice collection.

Figure 5:
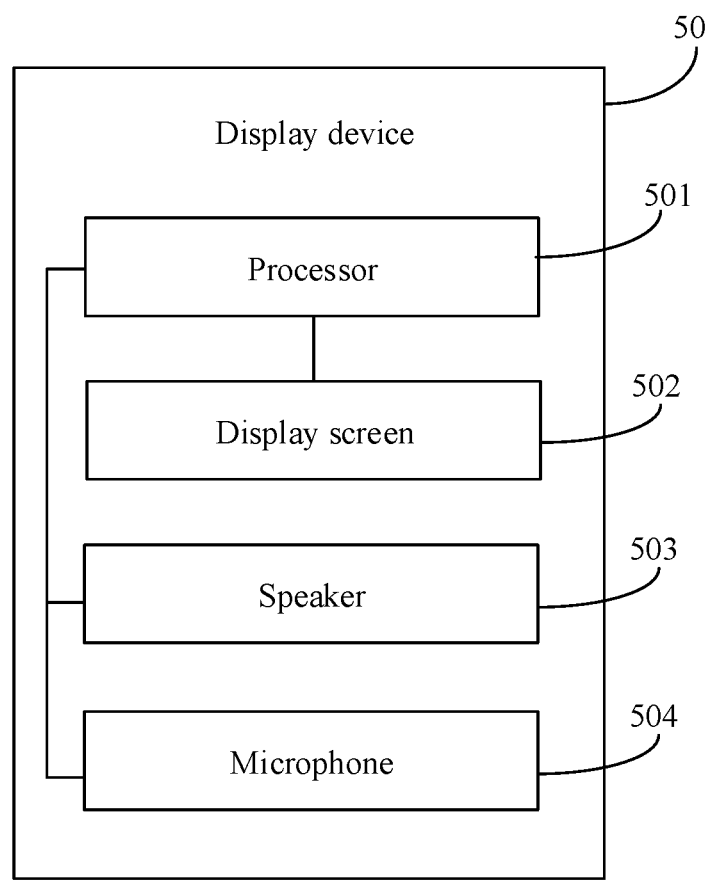
FIG. 5 is a schematic structural diagram of yet another display device according to an embodiment of the present disclosure.

FIG. 5 is a schematic structural diagram of yet another display device provided by an embodiment of the present disclosure. As shown in FIG. 5, the display device 50 may include a processor 501, a display screen 502 and a speaker 503.

The processor 501 may be configured to: acquire a works information query instruction; obtain a query intention by performing intention identification on the works information query instruction; determine a type of the query intention in a plurality of intention types; detect whether the works information query instruction contains at least one target entity; acquire a query result according to the query intention and reference information, wherein the reference information includes the type of the query intention and a detection result indicating whether the works information query instruction contains at least one target entity, and the query result includes at least one information of an image, an audio and a text; control the display screen to display an image in the query result if the query result includes the image; control the display screen to display a text in the query result if the query result includes the text; and control the speaker to play an audio in the query result if the query result includes the audio.

It can be seen that in the display device shown in FIG. 5, the processor 501 may include the instruction acquisition module 301, the intention identification module 302, the type determination module 303, the entity detection module 304 and the result acquisition module 305 in the display device shown in FIGS. 3 and 4. Optionally, the processor 501 may also include the works detection module 307, the to-be-introduced works determination module 308 and the audio detection module 309 in FIG. 4. The display screen 502 and the speaker 503 in FIG. 5 may constitute the information display module 306 in FIGS. 3 and 4.

Optionally, the display device shown in FIG. 5 may further include a microphone 504, and the processor 501 is configured to acquire the works information query instruction in voice form by the microphone 504.

It should be noted that the display device provided by the present embodiment may be any product or component having a display function, such as a liquid crystal display device, electronic paper, an OLED display device, a mobile phone, a tablet computer, a television, a display, a notebook computer, a digital photo frame or a navigator.

Exemplarily, the processor 501 is connected to the microphone 504, the speaker 503 and the display screen 502. The processor 501 is configured to receive the works information query instruction by the microphone 504, and to perform, according to the works information query instruction, at least one of following operations: controlling the speaker 503 to play a voice that is relevant to content to be queried by the works information query instruction; controlling the display screen 502 to display at least one of an image and a text that are both relevant to the content to be queried by the works information query instruction.

Optionally, the processor 501 is configured to determine an image to be displayed according to the works information query instruction, to control the display screen 502 to display the image to be displayed when a current image displayed by the display screen 502 is different from the image to be displayed, and to control the speaker 503 to play a voice for prompting that the current image is the same as the image to be displayed when the current image displayed by the display screen 502 is the same as the image to be displayed.

In the present disclosure, "at least one" refers to one or more, and the term "plurality" refers to two or more. "At least one of the following" or similar expressions refer to any combination of these items, including any combination of single items or plural items. For example, at least one of a, b and c can represent: a, b, c, a+b, a+c, b+c, and a+b+c, where a, b, c may be single items or multiple items.

It should be noted that the method embodiments and the corresponding device embodiments of the present disclosure may be cross referenced, which is not limited in the embodiments of the present disclosure. The sequence of the steps in the method embodiments may be adjusted appropriately, and the steps may be deleted or added according to the situation. Within the technical scope disclosed in the present disclosure, any variations of the method easily derived by a person of ordinary skill in the art shall fall within the protection scope of the present disclosure, which will not be repeated herein.

The foregoing descriptions are merely optional embodiments of the present disclosure, and are not intended to limit the present disclosure. Within the spirit and principles of the present disclosure, any modifications, equivalent substitutions, improvements, etc., are within the scope of protection of the present disclosure.

What is claimed is:

1. A method for querying works information, applicable to a display device, comprising:
   acquiring a works information query instruction;
   obtaining a query intention by performing intention identification on the works information query instruction;
   determining a type of the query intention in a plurality of intention types, wherein the plurality of intention types comprise one of a first type, a second type, or a third type, intentions involved in the first type comprise intentions relevant to introduction of works, intentions involved in the second type comprise intentions relevant to any information of an information group, the information group comprising author information and information of the works other than its introduction, and intentions involved in the third type comprise intentions relevant to play of works;
   detecting whether the works information query instruction contains at least one target entity, wherein the at least one target entity comprises a first target entity containing author information of works and a second target entity containing title information of the works;
   acquiring a query result according to the query intention and reference information, wherein the reference information comprises the type of the query intention and a detection result indicating whether the works information query instruction contains at least one target entity, and the query result comprises at least one information of an image, an audio, and a text; and
   displaying the query result; wherein
   when the works information query instruction contains the second target entity, the method further comprises:
   detecting whether current works displayed by the display device is the same as target works indicated by the second target entity, wherein the reference information further comprises a detection result indicating whether the current works is the same as the target works; and
   in a case that the type of the query intention is the first type, before acquiring the query result according to the query intention and the reference information, the method further comprises: determining works to be introduced according to the detection result indicating whether the works information query instruction contains the at least one target entity; wherein the works to be introduced is the target works indicated by the second target entity if the works information query instruction at least contains the second target entity, and the works to be introduced is any works of an author indicated by the first target entity if the works information query instruction contains the first target entity but does not contain the second target entity; and detecting whether an audio library contains an introduction audio of the works to be introduced, wherein the reference information further comprises a detection result indicating whether the audio library contains the introduction audio of the works to be introduced.

2. The method according to claim 1, wherein in the case that the type of the query intention is the first type, acquiring the query result according to the query intention and the reference information comprises:
   acquiring the introduction audio in the audio library if the audio library contains the introduction audio, the works information query instruction at least contains the second target entity, and the current works is the same as the target works, wherein the query result comprises the introduction audio;
   acquiring an image of the target works and the introduction audio in the audio library if the audio library contains the introduction audio, the works information query instruction at least contains the second target entity, and the current works is different from the target works, wherein the query result comprises the image of the target works and the introduction audio; and
   acquiring the introduction audio in the audio library if the audio library contains the introduction audio and the works information query instruction contains the first target entity but does not contain the second target entity, wherein the query result comprises the introduction audio.

3. The method according to claim 2, wherein in the case that the type of the query intention is the first type, acquiring the query result according to the query intention and the reference information comprises:
   acquiring an introduction text of the works to be introduced and an audio of the introduction text if the audio library does not contain the introduction audio, the works information query instruction at least contains the second target entity, and the current works is the same as the target works, wherein the query result comprises the introduction text of the works to be introduced and the audio of the introduction text;
   acquiring an image of the works to be introduced, an introduction text of the works to be introduced and an audio of the introduction text if the audio library does not contain the introduction audio, the works information query instruction at least contains the second target entity, and the current works is different from the target works, wherein the query result comprises the image of the works to be introduced, the introduction text of the works to be introduced and the audio of the introduction text; and acquiring an introduction text of the works to be introduced and an audio of the introduction text if the audio library does not contain the introduction audio, and the works information query instruction contains the first target entity but does not contain the second target entity, wherein the query result comprises the introduction text of the works to be introduced and the audio of the introduction text.

4. The method according to claim 1, wherein acquiring the query result according to the query intention and the reference information comprises:

acquiring an introduction text of the works to be introduced and an audio of the introduction text if the audio library does not contain the introduction audio, the works information query instruction at least contains the second target entity, and the current works is the same as the target works, wherein the query result comprises the introduction text of the works to be introduced and the audio of the introduction text;

acquiring an image of the works to be introduced, an introduction text of the works to be introduced and an audio of the introduction text if the audio library does not contain the introduction audio, the works information query instruction at least contains the second target entity, and the current works is different from the target works, wherein the query result comprises the image of the works to be introduced, the introduction text of the works to be introduced and the audio of the introduction text; and acquiring an introduction text of the works to be introduced and an audio of the introduction text if the audio library does not contain the introduction audio, and the works information query instruction contains the first target entity but does not contain the second target entity, wherein the query result comprises the introduction text of the works to be introduced and the audio of the introduction text.

5. The method according to claim 1, wherein in a case that the type of the query intention is the second type acquiring the query result according to the query intention and the reference information comprises:

acquiring a text of the any information and an audio of the text of the any information if the works information query instruction at least contains the second target entity and the current works is the same as the target works, wherein the query result comprises the text of the any information and the audio of the text of the any information;

acquiring an image of the target works, a text of the any information and an audio of the text of the any information if the works information query instruction at least contains the second target entity and the current works is different from the target works, wherein the query result comprises the image of the target works, the text of the any information, and the audio of the text of the any information; and acquiring a text of the any information and an audio of the text of the any information if the works information query instruction contains the first target entity but does not contain the second target entity, wherein the query result comprises the text of the any information, and the audio of the text of the any information.

6. The method according to claim 1, wherein in a case that the type of the query intention is the third type, acquiring the query result according to the query intention and the reference information comprises:

acquiring an audio for prompting that the current works is the target works if the works information query instruction at least contains the second target entity and the current works is the same as the target works, wherein the query result comprises the audio for prompting that the current works is the target works; and acquiring an image of the target works and an audio for indicating the target works if the works information query instruction at least contains the second target entity and the current works is different from the target works, wherein the query result comprises the image of the target works and the audio for indicating the target works.

7. The method according to claim 6, wherein acquiring the query result according to the query intention and the reference information further comprises:

determining whether an author of the current works is the same as a target author indicated by the first target entity of the query intention if the works information query instruction contains the first target entity but does not contain the second target entity;

acquiring an audio for indicating that the current works is the only works of the target author if the author of the current works is the same as the target author and the current works is the only works of the target author, wherein the query result comprises the audio for indicating that the current works is the only works of the target author;

acquiring an image of first works and an audio for indicating the first works if the author of the current works is the same as the target author and the current works is not the only works of the target author, wherein the first works is any works other than the current works of the target author, and the query result comprises the image of the first works and the audio for indicating the first works; and acquiring an image of second works and an audio for indicating the second works if the author of the current works is different from the target author, wherein the second works is any works of the target author, and the query result comprises the image of the second works and the audio for indicating the second works.

8. The method according to claim 7, wherein acquiring the query result according to the query intention and the reference information further comprises:

acquiring an image of third works and an audio for indicating the third works if the works information query instruction does not contain the first target entity or the second target entity, wherein the query result comprises the image of the third works and the audio for indicating the third works;

wherein the third works is any works of other authors than the author of the current works if the current works is the only works of the author; and the third works is any works of the author of the current works other than the current works if the current works is not the only works of the author.

9. The method according to claim 6, wherein acquiring the query result according to the query intention and the reference information further comprises:

acquiring an image of third works and an audio for indicating the third works if the works information query instruction does not contain the first target entity or the second target entity, wherein the query result comprises the image of the third works and the audio for indicating the third works;

wherein the third works is any works of other authors than the author of the current works if the current works is the only works of the author; and the third works is any works of the author of the current works other than the current works if the current works is not the only works of the author.

10. The method according to claim 1, wherein acquiring the works information query instruction comprises:
acquiring the works information query instruction in voice form by voice collection.

11. The method according to claim 1, wherein the works comprises a painting.

12. A display device, comprising a processor, a display screen, and a speaker; wherein
the processor is configured to:
acquire a works information query instruction;
obtain a query intention by performing intention identification on the works information query instruction;
determine a type of the query intention in a plurality of intention types, wherein the plurality of intention types comprise one of a first type, a second type, or a third type, intentions involved in the first type comprise intentions relevant to introduction of works, intentions involved in the second type comprise intentions relevant to any information of an information group, the information group comprising author information and information of the works other than its introduction, and intentions involved in the third type comprise intentions relevant to play of works;
detect whether the works information query instruction contains at least one target entity, wherein the at least one target entity comprises a first target entity containing author information of works and a second target entity containing title information of the works;
acquire a query result according to the query intention and reference information, wherein the reference information comprises the type of the query intention and a detection result indicating whether the works information query instruction contains at least one target entity, and the query result comprises at least one information of an image, an audio, and a text;
control the display screen to display an image in the query result if the query result comprises the image;
control the display screen to display a text in the query result if the query result comprises the text; and
control the speaker to play an audio in the query result if the query result comprises the audio;
when the works information query instruction contains the second target entity, the processor is further configured to: detect whether current works displayed by the display device is the same as target works indicated by the second target entity, wherein the reference information further comprises a detection result indicating whether the current works is the same as the target works; and
in a case that the type of the query intention is the first type, before acquiring the query result according to the query intention and the reference information, the processor is further configured to: determine works to be introduced according to the detection result indicating whether the works information query instruction contains the at least one target entity; wherein the works to be introduced is the target works indicated by the second target entity if the works information query instruction at least contains the second target entity, and the works to be introduced is any works of an author indicated by the first target entity if the works information query instruction contains the first target entity but does not contain the second target entity; and detect whether an audio library contains an introduction audio of the works to be introduced, wherein the reference information further comprises a detection result indicating whether the audio library contains the introduction audio of the works to be introduced.

13. The display device according to claim 12, further comprising a microphone; wherein the processor is configured to:
acquire the works information query instruction in voice form by the microphone.

* * * * *